United States Patent
Kilian-Kehr et al.

(10) Patent No.: US 7,818,585 B2
(45) Date of Patent: Oct. 19, 2010

(54) SECURE LICENSE MANAGEMENT

(75) Inventors: Roger Kilian-Kehr, Darmstadt (DE); Jan Kuemmerle, Eppstein (DE)

(73) Assignee: SAP Aktiengesellschaft, Walldorf (DE)

( * ) Notice: Subject to any disclaimer, the term of this patent is extended or adjusted under 35 U.S.C. 154(b) by 1091 days.

(21) Appl. No.: 11/020,386

(22) Filed: Dec. 22, 2004

(65) Prior Publication Data

US 2006/0137022 A1    Jun. 22, 2006

(51) Int. Cl.
*H04L 29/06*    (2006.01)
*G06F 21/00*    (2006.01)

(52) U.S. Cl. ............................. 713/193; 705/59; 726/27

(58) Field of Classification Search ................ 713/193, 713/194, 190, 100, 2; 705/57, 58, 59; 726/26, 726/27, 28, 31; 380/284, 285
See application file for complete search history.

(56) References Cited

U.S. PATENT DOCUMENTS

| | | | | |
|---|---|---|---|---|
| 5,933,498 | A * | 8/1999 | Schneck et al. ............... | 705/54 |
| 6,920,567 | B1 * | 7/2005 | Doherty et al. ............... | 726/22 |
| 2003/0037237 | A1 | 2/2003 | Abgrall et al. | |
| 2004/0039924 | A1 | 2/2004 | Baldwin et al. | |
| 2004/0078572 | A1 | 4/2004 | Pearson et al. | |
| 2004/0093505 | A1 | 5/2004 | Hatakeyama et al. | |
| 2004/0230797 | A1 | 11/2004 | Ofek et al. | |
| 2005/0033991 | A1 * | 2/2005 | Crane ......................... | 713/201 |
| 2005/0044016 | A1 * | 2/2005 | Irwin et al. .................... | 705/30 |
| 2005/0060561 | A1 * | 3/2005 | Pearson et al. .............. | 713/194 |
| 2005/0060568 | A1 * | 3/2005 | Beresnevichiene et al. .. | 713/200 |
| 2005/0141717 | A1 * | 6/2005 | Cromer et al. .............. | 380/277 |

OTHER PUBLICATIONS

Trusted Computing Group, "Trusted Computing Platform Alliance (TCPA) Main Specification Version 1.1b", TCPA Main Specification, 332 pages, Feb. 22, 2002.

* cited by examiner

*Primary Examiner*—Gilberto Barron, Jr.
*Assistant Examiner*—Izunna Okeke
(74) *Attorney, Agent, or Firm*—Fish & Richardson P.C.

(57) ABSTRACT

Systems, methods, and computer program products for secure license management. A host computer runs in a trusted state. A license manager is installed on the host computer. The license manager is configured to provide access to one or more software programs. The one or more software programs are accessible only through the license manager. The license manager is bound to the trusted state of the host computer, such that if the trusted state ceases to exist, then the license manager is not executable and the one or more software programs are not accessible. The host computer can be a TCPA (Trusted Computing Platform Alliance) enabled computer.

20 Claims, 4 Drawing Sheets

SECURE LICENSE MANAGEMENT

BACKGROUND

The present disclosure relates to data processing by digital computer, and more particularly to license management.

Software vendors use license management programs, also referred to as license managers, to prevent unauthorized use of the software. The license manager is designed to enforce the conditions of the software license and to prevent access to the software when those conditions are not met.

Unfortunately, the license manager, like any software program, is vulnerable to tampering. Conventional license managers, however, are unable to determine the trustworthiness of the computing environment in which they are running.

SUMMARY OF THE INVENTION

Methods, systems, and computer program products, implementing techniques for license management.

In one general aspect, a system implementing the techniques comprises a host computer running in a trusted state, and a license manager installed on the host computer. The license manager is configured to provide access to one or more software programs. The one or more software programs are accessible only through the license manager. The license manager is bound to the trusted state of the host computer, such that if the trusted state ceases to exist, then the license manager is not executable and the one or more software programs are not accessible.

Implementations can include one or more of the following features. The host computer may be a TCPA (Trusted Computing Platform Alliance) enabled computer.

The trusted state may be established by booting the host computer using a secure boot process.

The host computer includes hardware components and software components. The software components may include an operating system. The hardware components may include a Core Root of Trust for Measurement (CRTM). The CRTM may be a trusted component.

The secure boot process may involve using the trusted component to verify the trustworthiness of the hardware components before handing system control over to the operating system, which then verifies the integrity of the software components.

The hardware components may further include a Trusted Platform Module (TPM). The trustworthiness of the hardware and software components may be verified using system configuration data stored in the TPM.

The license manager may be partitioned into a dynamic data section and a static code section, the dynamic data section may include data that changes during execution of the license manager, the static code section including data that does not change during execution of the license manager.

The static code section may be partitioned into two subsections, a first subsection that stores code for the software programs and a second subsection that stores configuration data for the license manager.

The dynamic data section may be protected by a cryptographic key (data key), the static code section is protected by a different cryptographic key (code key).

The data key and the code key may be protected by a different cryptographic key (external key). The external key may be bound to the trusted state of the host computer.

In another general aspect, a computer program product implementing the techniques is operable to cause data processing apparatus to perform operations including verifying that the host computer is running in a trusted state, receiving a first cryptographic key from the host computer, the first cryptographic key being bound to the trusted state of the host computer, encrypting the license manager using the first cryptographic key, and transferring the encrypted license manager to the host computer.

Implementations can include one or more of the following features. Verifying that the host computer is running in a trusted state may include performing a remote attestation process on the host computer.

Performing a remote attestation process on the host computer may include: receiving system configuration data from the host computer and comparing the received system configuration data to a set of known system configurations.

The license manager may be partitioned into a dynamic data section and a static code section, the dynamic data section may include data that changes during execution of the license manager, the static code section including data that does not change during execution of the license manager.

Encrypting the license manager using the first cryptographic key may include encrypting the dynamic data section using a second cryptographic key, encrypting the static code section using a third cryptographic key, and encrypting the first and second cryptographic keys using the first cryptographic key.

The techniques can be implemented to realize one or more of the following advantages. The license manager is secure from tampering. A trusted state is established on the host computer before the license manager is installed on the host computer. As long as the trusted state exists, the license manager can be assured that the hosting environment does not contain any rouge programs that attempt to prevent the license manager from working correctly. One implementation provides all of the above advantages.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
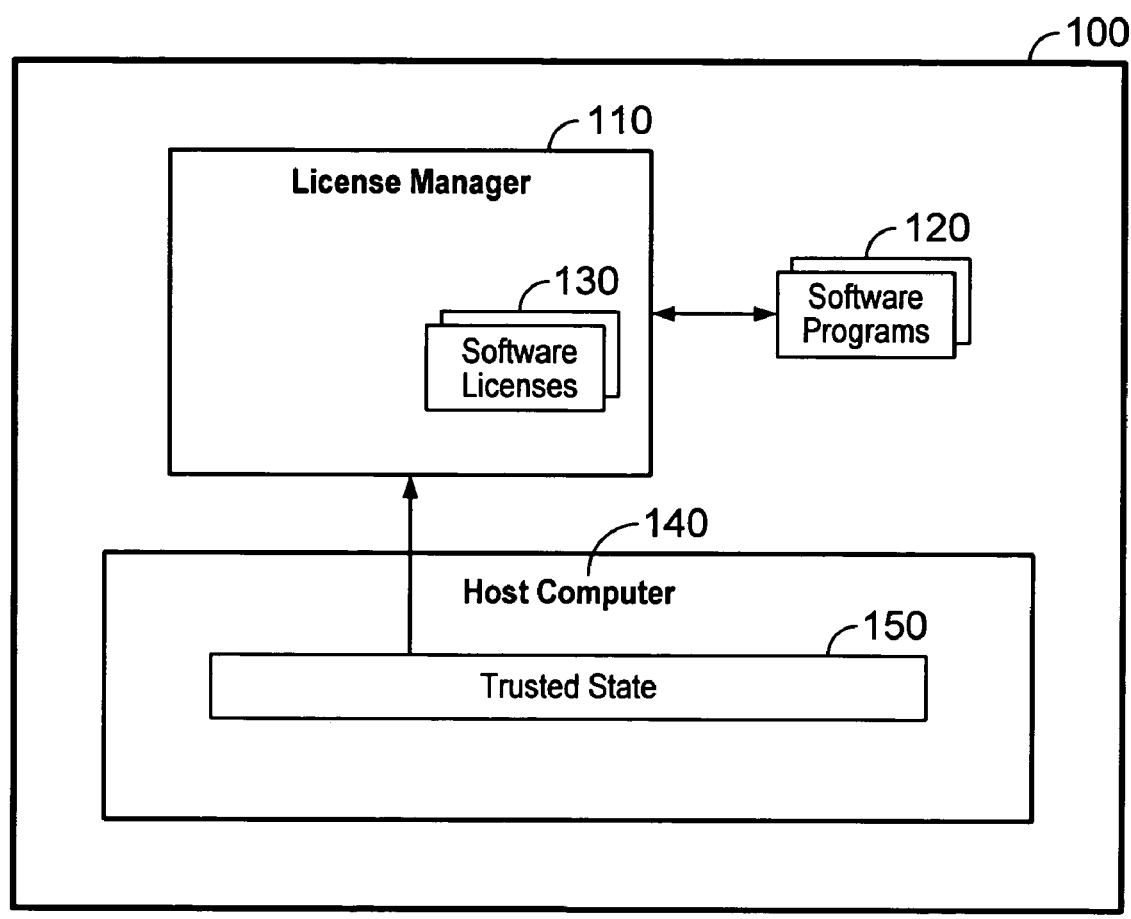
FIG. 1 illustrates a system for secure license management.

As shown in FIG. 1, a system 100 includes a license manager 110 for managing the use of one or more software programs 120. The license manager 110 enforces certain conditions of use, as defined by one or more software licenses 130 associated with each software program 120. The software programs 120 are only accessible through the license manager 110. Thus, if the license manager 110 is not running, then the software programs 120 are not accessible.

The license manager 110 and the software programs 120 are installed on a host computer 140.

Prior to installing the license manager 110 on the host computer 140, a trusted state 150 is established on the host computer 140.

The license manager 110 is then bound to this trusted state 150 so that the license manager 110 can only operate while the trusted state 150 exists. If the trusted state 150 ceases to exist, then the license manager 110 cannot operate and the one or more software programs 120 cannot be accessed.

The trusted state 150 is established by booting the host computer 140 using a secure boot process. In one implementation, the secure boot process requires that the host computer 140 be a TCPA-enabled computer. TCPA (Trusted Computing Platform Alliance) is an initiative led by various computing companies (e.g., Advanced Micro Devices, Hewlett-Packard, Intel, IBM, Microsoft, Sony, Sun) to implement technologies for trusted computing. This group of companies, also known as the Trusted Computing Group has published a TCPA specification (available at http://www.trustedcomputinggroup.org) that describes the technologies developed by this group.

Figure 2:
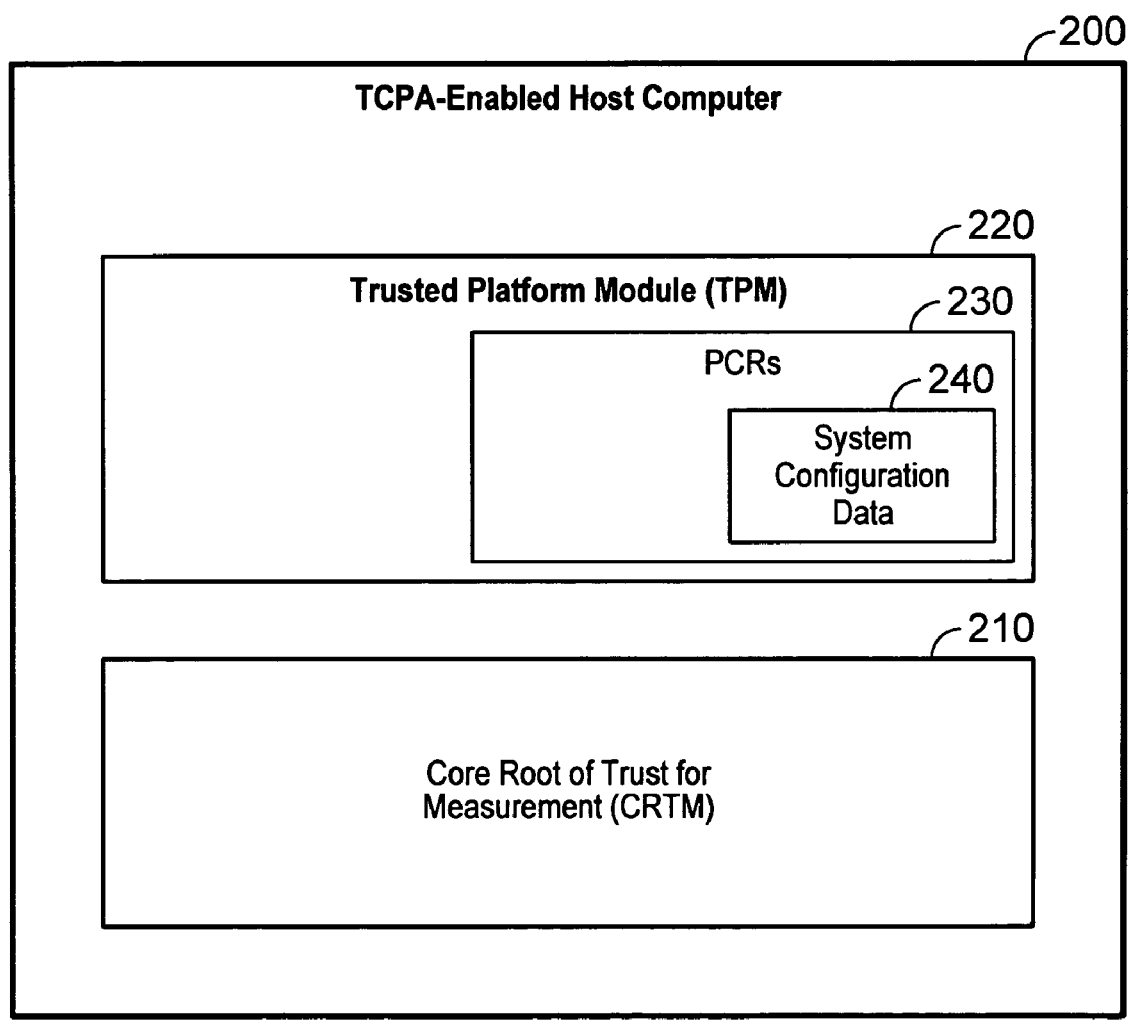
FIG. 2 illustrates a TCPA-enabled host computer.

As shown in FIG. 2, a TCPA-enabled host computer 200 includes two TCPA components, a Core Root of Trust for Measurement (CRTM) 210 and a Trusted Platform Module (TPM) 220.

In one implementation, the trusted platform module 220 is a computer chip (e.g., a smartcard) that is hard-wired to provide certain functions, for example, key generation and controlled access to the generated keys. The trusted platform module 220 includes a set of memory registers known as platform configuration registers (PCRs) 230. The platform configuration registers 230 store system configuration data 240. The system configuration data 240 can be metrics taken from various hardware and software components of the host computer 140. As will be described below, these metrics will be used during the secure boot process to verify the trustworthiness of the host computer 140.

The CRTM 210 is the only portion of the host computer 140 that can be trusted initially, that is, before the trusted state 150 is established on the host computer 140. In one implementation, the CRTM 210 is the BIOS (Basic Input/Output System) of the host computer 140. Alternatively, the CRTM 210 makes up only a portion of the host computer's BIOS.

The CRTM 210 begins executing when the host computer 200 is started. The CRTM 210 verifies the integrity of the hardware components before handing system control over to the operating system. The operating system then verifies the integrity of the software components. The verification of the hardware and software components is performed using the system configuration data 240 stored in the platform configuration registers 230 of the trusted platform module 220. The metrics are a reflection of how the system components are configured. If the system configuration is tampered with or otherwise modified, the metrics will reflect this change. If any changes to the hardware or software components are detected by either the CRTM 210 or the operating system, then the boot process is stopped. Once the boot process has been completed, a trusted state 150 has been established on the host computer 140. Once the trusted state 150 has been established, the license manager 110 can be installed on the host computer 140.

Figure 3:
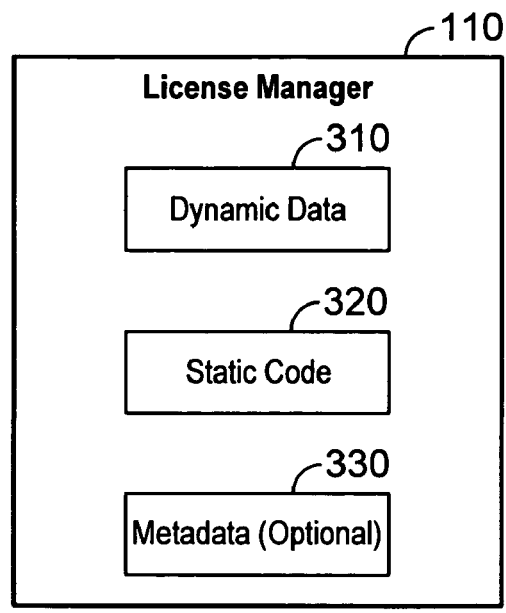
FIG. 3 illustrates a license manager.

As shown in FIG. 3, in one implementation, the license manager 110 is partitioned into a dynamic data section 310 and a static code section 320. Optionally, the license manager 110 can contain a third partition, metadata section 330, for storing metadata about the license manager 110. For example, the metadata can include information identifying the software programs 120 managed by the license manager 110, and the authorized users of these programs 120.

The dynamic data section 310 contains data that the license manager 110 needs to perform its functions. This data is dynamic, meaning that its value changes during execution of the license manager 110. For example, this data can include a counter value that counts the number of times a software program 120 has been executed.

The static code section 320 contains code that is required by the software programs 120 to run. The static code section 320 also contains configuration data that is required by the license manager 110. For example, the configuration data may indicate which network port and which host address (e.g., license.xxx.com) will be used by the license manager 110. The static code section 320 can be partitioned into two subsections, one subsection to store the software program code and the other subsection to store the license manager configuration data.

Figure 4:
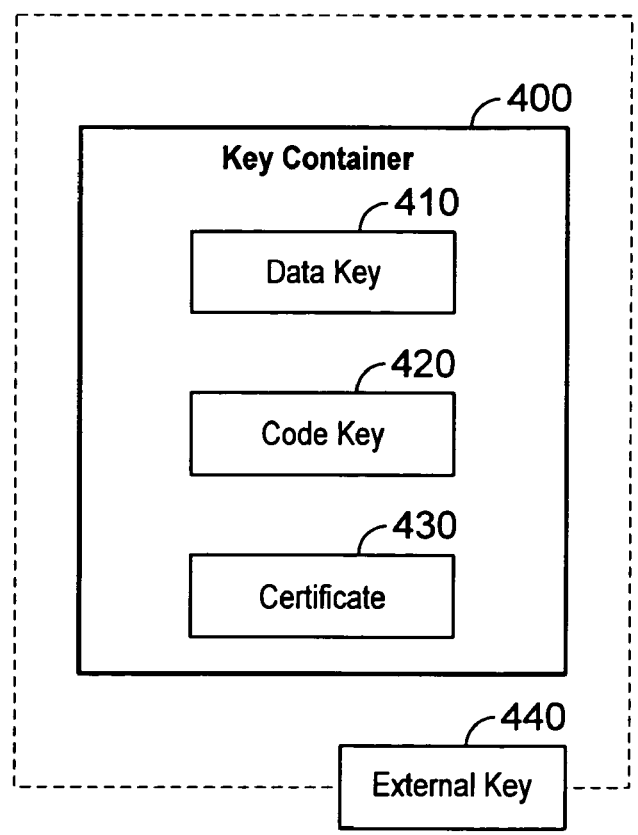
FIG. 4 illustrates a key container.

In one implementation, the license manager 110 is protected by one or more cryptographic keys. These keys are stored in a key container 400, shown in FIG. 4. The key container 400 contains a data key 410 that is used to encrypt the dynamic data section 310 of the license manager 110 and a code key 420 that is used to encode the static code section 320 of the license manager 120. The data key 410 and the code key 420 are different cryptographic keys.

The key container 400 also contains a certificate 430 obtained from a certifying agency. This certificate is used to authenticate the static code section 320. The dynamic data section 310 is not authenticated because the data stored in the dynamic data section 310 is expected to change.

The entire key container 400 is protected by a cryptographic key that will be referred to as the external key 440. The external key 440 is generated by the trusted platform module 220 and stored within the trusted platform module 220. If the host computer 140 is not running in a trusted state 150, the trusted platform module 220 will not release the external key 440.

In one implementation, the external key 440 is an asymmetric key whereas the data key 410 and code key 420 are symmetric keys. Alternatively, the data key 410 and code key 420 can also by asymmetric keys. In this specification, the data key 410 and the code key 420 will be referred to collectively as the internal keys.

Figure 5:
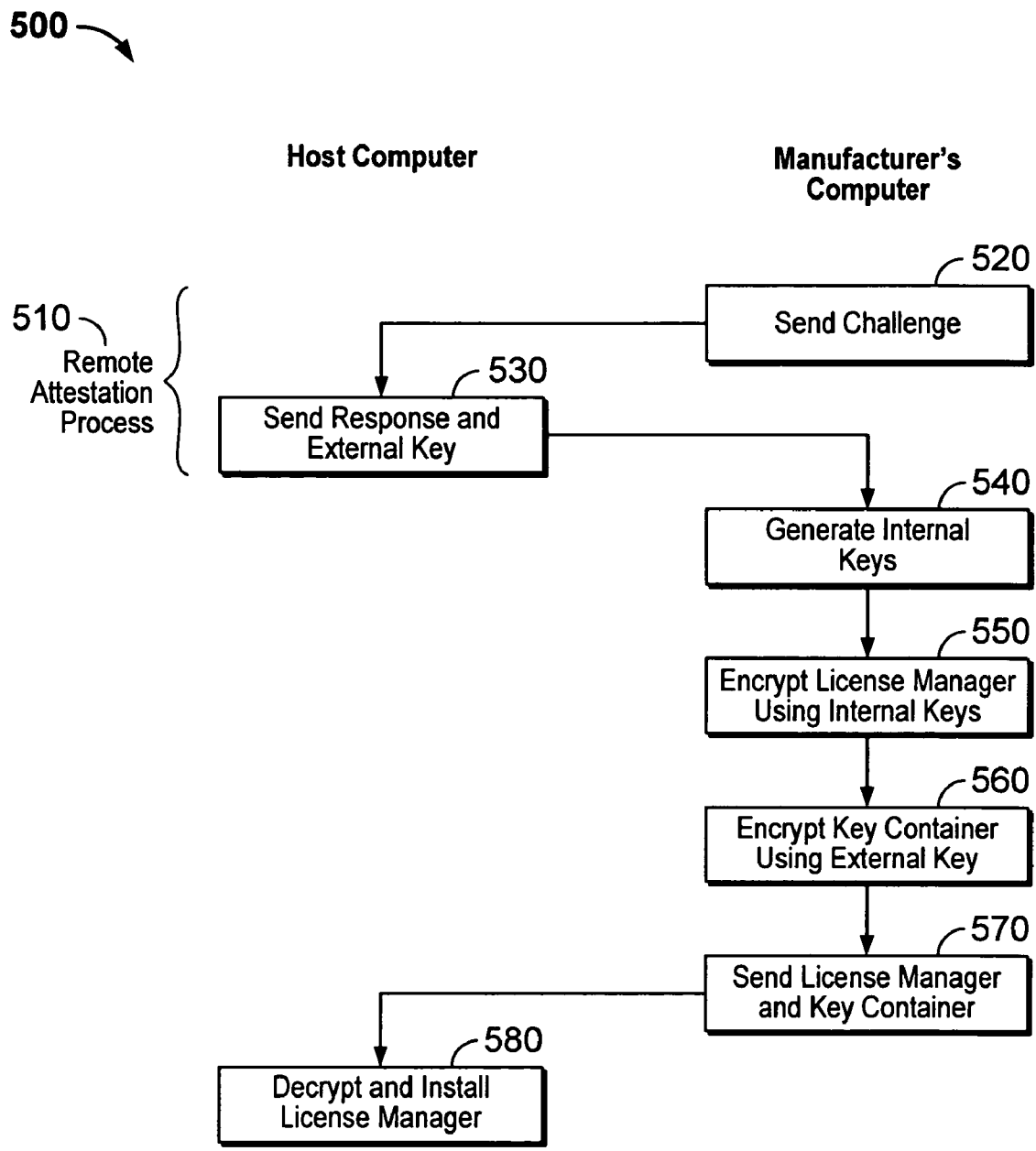
FIG. 5 illustrates a process for transferring the license manager and the key container to the host computer.

FIG. 5 illustrates a process 500 for transferring the license manager 110 to the host computer 140. This process is performed only after the trusted state 150 has been established on the host computer 140.

Typically, this process is triggered by the user of the host computer 140 making contact with the manufacturer of the software program 120 to request that the license manager 110 for the software program 120 be transferred to the host computer 140.

Before allowing this transfer to occur, the manufacturer verifies the trustworthiness of the host computer 140 using a remote attestation process 510. As part of the remote attestation process 510, the manufacturer's computer sends a challenge to the host computer 140 (step 520).

In response to this challenge, the host computer 140 sends to the manufacturer's computer a signed version of the system configuration data 240. The purpose of signing the data is to attest to the authenticity of the data. As part of the response, the host computer 140 also sends the external key 440 to the manufacturer's computer (step 530). More specifically what is sent is only the public part of the external key 440. The private part is retained within the trusted platform module 220.

Upon receiving signed configuration data and the external key 440, the manufacturer verifies the trustworthiness of the host computer 140, for example, by comparing the host computer's system configuration to system configurations for computer systems known to be trusted.

Once the trustworthiness of the host computer 140 has been verified, the manufacturer's computer generates the internal keys (data key 410 and code key 420) (step 540) and encrypts the license manager 110 using the internal keys (step 550). The internal keys are generated specifically for each installation of the license manager 110 and are different for each installation.

The manufacturer then stores the internal keys 410, 420 in the key container 400 and encrypts the key container using the external key 440 (step 560). The manufacturer then sends the encrypted key container 400 and the encrypted license manager 110 to the host computer 140 (step 570).

The host computer 140 unlocks the key container 400 using the private part of the external key 440 and retrieves the internal keys from inside the key container 400. The host computer 140 then unlocks the license manager 110 using the internal keys and installs the license manager (step 580).

As previously mentioned, the external key 440 is bound to the trusted state 150. Thus, if the host computer 140 is no longer running in the trusted state 150, then the host computer 140 will be unable to unlock the key container 400 and gain access to the license manager 110.

The various implementations of the invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations are within the scope of the following claims. For example, the operations can be performed in a different order and still achieve desirable results. In certain implementations, multitasking and parallel processing may be preferable.

What is claimed is:

1. A computer-implemented method comprising:

receiving a request from a host computer to transfer a license manager and one or more software applications to the host computer, the license manager for managing a use of the one or more software programs by enforcing conditions of use as defined by a license associated with each software program;

sending a challenge message to the host computer based on receiving the request, the challenge message requesting transmission of signed system configuration data from the host computer;

receiving from the host computer, in response to the challenge message, the signed system configuration data and a public part of an external key generated at the host computer, the signed system configuration data including metrics taken from hardware and software components of the host computer that reflect how the host computer is configured;

verifying the metrics against known trusted data; and when the known trusted data verifies the metrics:
generating a set of unique internal keys specific to each different installation of the license manager,
encrypting the license manager based on the set of unique internal keys, the license manager being partitioned into a dynamic data section, a static code section, and a metadata section for storing metadata about the license manager,
storing the set of unique internal keys in a key container, wherein the key container further comprises a certificate obtained by a certifying agency and used for authenticating the static code section of the license manager,
encrypting the key container based on the external key generated at the host computer, and
sending the encrypted license manager and the encrypted key container to the host computer.

2. The method of claim 1,
wherein encrypting the license manager based on the set of unique internal keys comprises encrypting each partition of the license manager with a different internal key from the set of unique internal keys,
wherein the set of unique internal keys further comprises a data key for encrypting the dynamic data section of the license manager, and a code key for encrypting the static code section of the license manager, and
wherein the external key is an asymmetric key, and the data key and code key are asymmetric keys.

3. The method of claim 1, wherein the metadata section comprises information identifying the one or more software programs managed by the license manager and identifying authorized users of the one or more software programs.

4. The method of claim 1, wherein the dynamic data section comprises a counter value that counts a quantity of times each of the one or more software applications has been executed.

5. The method of claim 1, wherein the static code section comprises configuration data that indicates which network port and which host address will be used by the license manager.

6. The method of claim 1, wherein the system configuration data is generated by a Core Root of Trust for Measurement (CRTM) component of the host computer.

7. The method of claim 1, wherein the host computer is a Trusted Computing Platform Alliance (TCPA) enabled computer.

8. A machine-readable storage device encoded with a computer program, the computer program comprising instructions that, when executed, operate to cause a computer to perform operations comprising:
receiving a request from a host computer to transfer a license manager and one or more software applications to the host computer, the license manager for managing a use of the one or more software programs by enforcing conditions of use as defined by a license associated with each software program;
sending a challenge message to the host computer based on receiving the request, the challenge message requesting transmission of signed system configuration data from the host computer;
receiving from the host computer, in response to the challenge message, the signed system configuration data and a public part of an external key generated at the host computer, the signed system configuration data including metrics taken from hardware and software components of the host computer that reflect how the host computer is configured;
verifying the metrics against known trusted data; and
when the known trusted data verifies the metrics:
generating a set of unique internal keys specific to each different installation of the license manager,
encrypting the license manager based on the set of unique internal keys, the license manager being partitioned into a dynamic data section, a static code section, and a metadata section for storing metadata about the license manager,
storing the set of unique internal keys in a key container,
encrypting the key container based on the external key generated at the host computer, wherein the key container further comprises a certificate obtained by a certifying agency and used for authenticating the static code section of the license manager, and
sending the encrypted license manager and the encrypted key container to the host computer.

9. The machine-readable storage device of claim 8,
wherein encrypting the license manager based on the set of unique internal keys comprises encrypting each partition of the license manager with a different internal key from the set of unique internal keys,
wherein the set of unique internal keys further comprises a data key for encrypting the dynamic data section of the license manager, and a code key for encrypting the static code section of the license manager, and
wherein the external key is an asymmetric key, and the data key and code key are symmetric keys.

10. The machine-readable storage device of claim 8, wherein the metadata section comprises information identifying the one or more software programs managed by the license manager and identifying authorized users of the one or more software programs.

11. The machine-readable storage device of claim 8, wherein the dynamic data section comprises a counter value that counts a quantity of times each of the one or more software applications has been executed.

12. The machine-readable storage device of claim 8, wherein the static code section comprises configuration data that indicates which network port and which host address will be used by the license manager.

13. The machine-readable storage device of claim 8, wherein the system configuration data is generated by a Core Root of Trust for Measurement (CRTM) component of the host computer.

14. The machine-readable storage device of claim 8, wherein the host computer is a Trusted Computing Platform Alliance (TCPA) enabled computer.

15. A system comprising:
one or more computers;
a computer-readable medium coupled to the one or more computers having instructions stored thereon which, when executed by the one or more computers, causes the one or more computers to perform operations comprising:
receiving a request from a host computer to transfer a license manager and one or more software applications to the host computer, the license manager for managing a use of the one or more software programs by enforcing conditions of use as defined by a license associated with each software program,
sending a challenge message to the host computer based on receiving the request, the challenge message requesting transmission of signed system configuration data from the host computer,
receiving from the host computer, in response to the challenge message, the signed system configuration data and a public part of an external key generated at the host computer, the signed system configuration data including metrics taken from hardware and software components of the host computer that reflect how the host computer is configured, verifying the metrics against known trusted data, and when the known trusted data verifies the metrics:

generating a set of unique internal keys specific to each different installation of the license manager, encrypting the license manager based on the set of unique internal keys, the license manager being partitioned into a dynamic data section, a static code section, and a metadata section for storing metadata about the license manager, storing the set of unique internal keys in a key container, wherein the key container further comprises a certificate obtained by a certifying agency and used for authenticating the static code section of the license manager, encrypting the key container based on the external key generated at the host computer, and sending the encrypted license manager and the encrypted key container to the host computer.

16. The system of claim 15, wherein encrypting the license manager based on the set of unique internal keys comprises encrypting each partition of the license manager with a different internal key from the set of unique internal keys, wherein the set of unique internal keys further comprises a data key for encrypting the dynamic data section of the license manager, and a code key for encrypting the static code section of the license manager, and wherein the external key is an asymmetric key, and the data key and code key are asymmetric keys.

17. The system of claim 15, wherein the metadata section comprises information identifying the one or more software programs managed by the license manager and identifying authorized users of the one or more software programs.

18. The system of claim 15, wherein the dynamic data section comprises a counter value that counts a quantity of times each of the one or more software applications has been executed.

19. The computer-implemented method of claim 1, wherein the static code section comprises a subsection to store the software program code and another subsection to store the license manager configuration data.

20. The machine-readable storage device of claim 8, wherein the static code section comprises a subsection to store the software program code and another subsection to store the license manager configuration data.

* * * * *